(12) United States Patent
Peng

(10) Patent No.: US 8,479,049 B2
(45) Date of Patent: Jul. 2, 2013

(54) ELECTRONIC DEVICE AND METHOD FOR DETECTING POWER FAILURE TYPE

(75) Inventor: Jian Peng, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 178 days.

(21) Appl. No.: 13/086,404

(22) Filed: Apr. 14, 2011

(65) Prior Publication Data

US 2012/0047404 A1 Feb. 23, 2012

(30) Foreign Application Priority Data

Aug. 19, 2010 (CN) .......................... 2010 1 0257315

(51) Int. Cl.
*G06F 11/00* (2006.01)

(52) U.S. Cl.
USPC ................................ 714/36; 714/25; 714/48

(58) Field of Classification Search
USPC ............................................................ 714/36
See application file for complete search history.

(56) References Cited

U.S. PATENT DOCUMENTS

| 5,951,686 A * | 9/1999 | McLaughlin et al. ............ 713/2 |
| 2003/0226059 A1* | 12/2003 | Braun .............................. 714/20 |
| 2010/0229048 A1* | 9/2010 | Karam ............................. 714/48 |

* cited by examiner

*Primary Examiner* — Sarai Butler
(74) *Attorney, Agent, or Firm* — Altis Law Group, Inc.

(57) ABSTRACT

A method for detecting a power failure type of an electronic device sets a shutdown flag as a first value when the electronic device is turned on, modifies the shutdown flag to a second value if a shutdown status of the electronic device is detected, and modifies the shutdown flag to a third value when the electronic device keeps the shutdown status for a predetermined time. The method further determines the power failure type of the electronic device according to a value of the shutdown flag when the electronic device is turned on the next time.

16 Claims, 3 Drawing Sheets

ELECTRONIC DEVICE AND METHOD FOR DETECTING POWER FAILURE TYPE

BACKGROUND

1. Technical Field

Embodiments of the present disclosure relate to power management technology, and particularly to an electronic device and method for detecting a power failure type of the electronic device.

2. Description of Related Art

Servers (e.g., computers) may be accidentally shut down because of a direct current (DC) power failure or an alternating current (AC) power failure. The AC power failure may be detected by a basis input output system (BIOS) of a motherboard of the server. The BIOS detects the AC power failure using a south bridge installed in the motherboard, and records an AC power failure log into a complementary metal oxide semiconductor CMOS. However, the DC power failure cannot be detected using the above-mentioned method. Therefore, a more efficient method for detecting a power failure type of an electronic device is desired.

DETAILED DESCRIPTION

All of the processes described below may be embodied in, and fully automated via, functional code modules executed by one or more general purpose electronic devices or processors. The code modules may be stored in any type of non-transitory readable medium or other storage device. Some or all of the methods may alternatively be embodied in specialized hardware. Depending on the embodiment, the non-transitory readable medium may be a hard disk drive, a compact disc, a digital video disc, a tape drive or other suitable storage medium.

Figure 1:
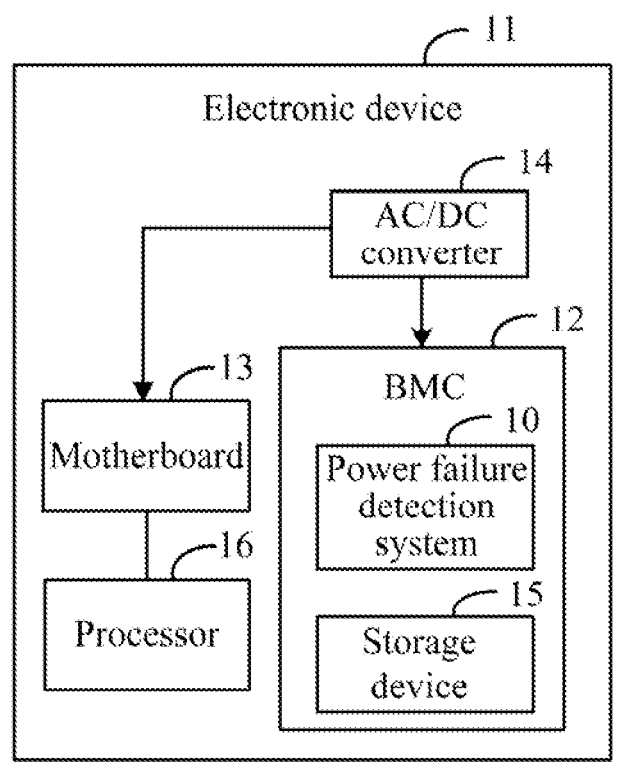
FIG. 1 is a block diagram of one embodiment of an electronic device.

FIG. 1 is a block diagram of one embodiment of an electronic device 11. The electronic device 11 includes a baseboard management controller (BMC) 12, a motherboard 13, an alternating current/direct current (AC/DC) converter 14, and at least one processor 16. The BMC 12 includes a power failure detection system 10 and storage device 15. The power failure detection system 10 may be used to detect a power failure type of the electronic device 11. In one embodiment, the power failure type may include, but is not limited to, a DC power failure and an AC power failure. The electronic device 11 may be a server, the storage device 15 may be a nonvolatile storage, such as a field replacement unit (FRU) storage area. In one embodiment, the AC/DC converter 14 is used to convert the alternating current into the direct current, and transmit the direct current to the BMC 12 and the motherboard 13.

Figure 2:
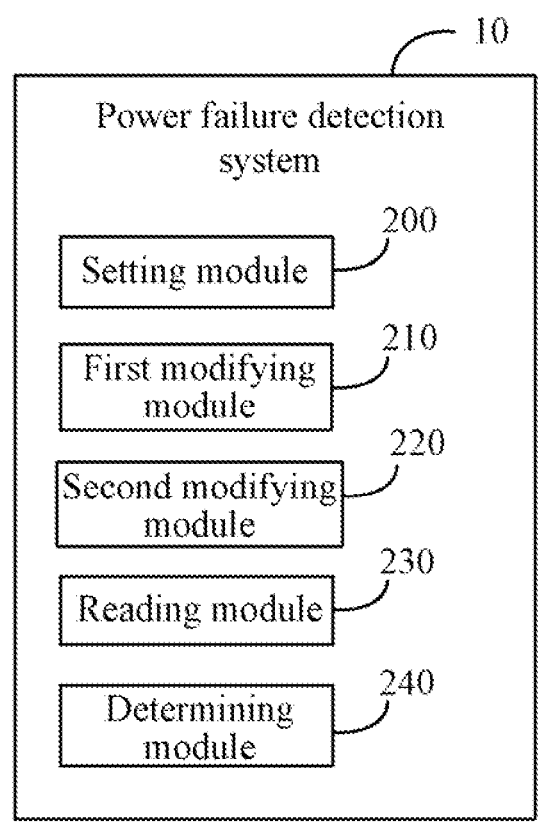
FIG. 2 is a block diagram of one embodiment of a power failure detection system in the electronic device.

FIG. 2 is a block diagram of one embodiment of the power failure detection system 10 in the electronic device 11. In one embodiment, the power failure detection system 10 may include one or more modules, for example, a setting module 200, a first modifying module 210, a second modifying module 220, a reading module 230, and a determining module 240. The one or more modules 200-240 may comprise computerized code in the form of one or more programs that are stored in the storage device 15 (or memory). The computerized code includes instructions that are executed by the at least one processor 16 to provide functions for the one or more modules 200-240.

Figure 3:
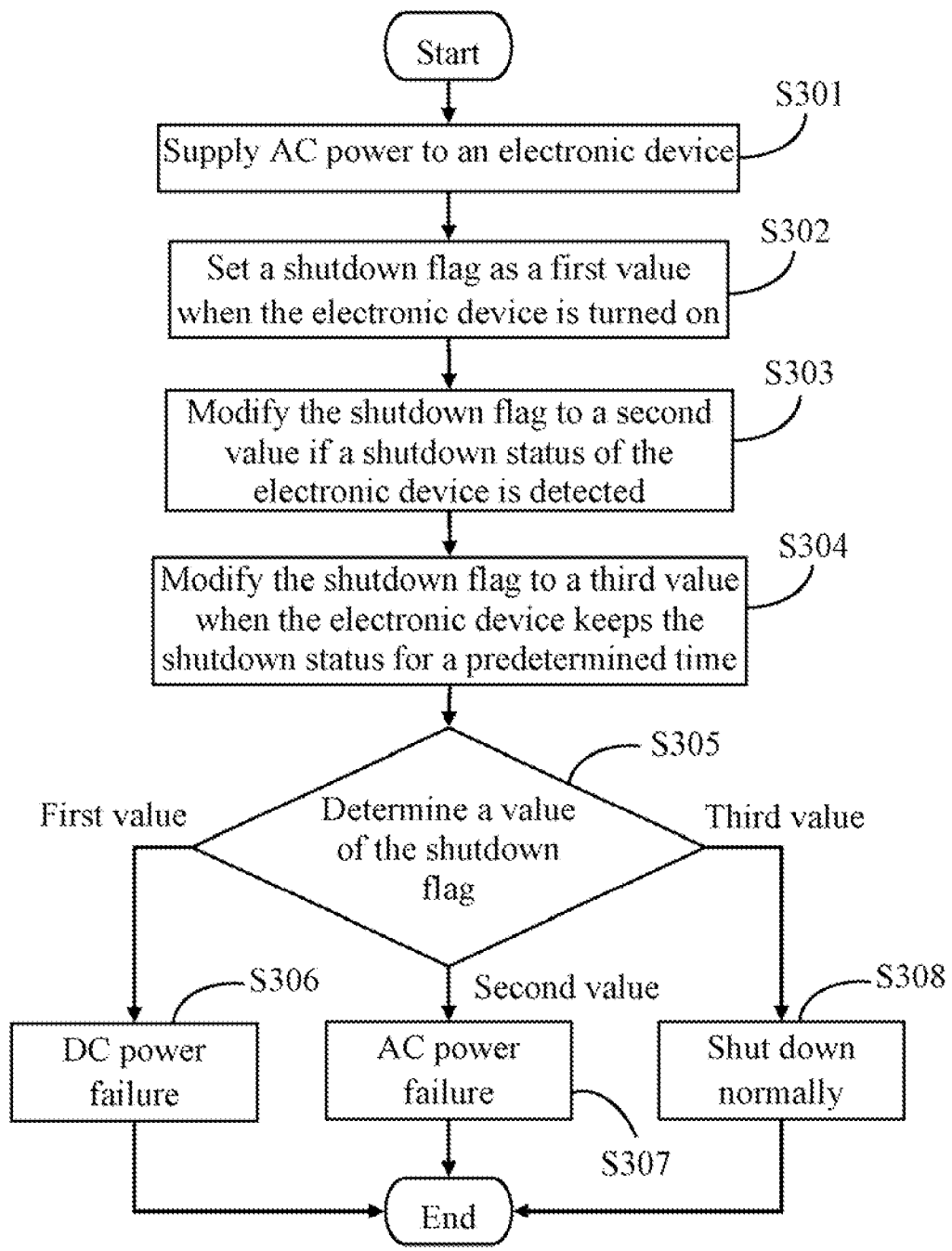
FIG. 3 is a flowchart of one embodiment of a method for detecting a power failure type of the electronic device.

FIG. 3 is a flowchart of one embodiment of a method for detecting a power failure type of the electronic device 11. Depending on the embodiment, additional blocks may be added, others removed, and the ordering of the blocks may be changed.

In block S301, AC power is supplied to the electronic device 11.

In block S302, the setting module 200 sets a shutdown flag as a first value when the electronic device 11 is turned on, and stores the shutdown flag in the storage device 15 of the BMC 12. For example, the first value is "1".

In block S303, the first modifying module 210 modifies the shutdown flag to a second value if a shutdown status of the electronic device 11 is detected by the first modifying module 210. For example, the second value is "2".

If the electronic device 11 is shut down because of the DC power failure, the AC/DC converter 14 stops transmitting the direct current to the BMC 12. The first modifying module 210 does not detect the shutdown status of the electronic device 11, and does not modify the shutdown flag.

If the electronic device 11 is shut down because of the AC power failure, the AC/DC converter 14 continues to transmit the direct current to the BMC 12 for a short time (e.g., two seconds). The first modifying module 210 detects the shutdown status of the electronic device 11, and modifies the shutdown flag to the second value.

If the electronic device 11 is shut down normally, the AC/DC converter 14 continues to transmit the direct current to the BMC 12 continuously. The first modifying module 210 detects the shutdown status of the electronic device 11, and modifies the shutdown flag to the second value.

In block S304, the second modifying module 220 modifies the shutdown flag to a third value when the electronic device 11 keeps the shutdown status for a predetermined time (e.g., five seconds). For example, the third value is "0". In one embodiment, the predetermined time is greater than the short time. The predetermined time is used to determine if the electronic device 11 is shut down normally or because of the AC power failure.

As mentioned above, if the electronic device 11 is shut down because of the AC power failure, the AC/DC converter 14 stops transmitting the direct current to the BMC 12 after the predetermined time. The BMC 12 is shut down after the predetermined time, and the second modifying module 220 does not modify the shutdown flag from the second value to the third value.

If the electronic device 11 is shut down normally, the AC/DC converter 14 continues to transmit the direct current to the BMC 12 after the predetermined time. The second modifying module 220 modifies the shutdown flag to the third value.

In block S305, the reading module 230 reads a value of the shutdown flag from the storage device 15 of the BMC 12 the next time the electronic device 11 is turned on and determines if the value of the shutdown flag is the first value, the second value or the third value. If the shutdown flag is the first value, the procedure goes to block S306. If the shutdown flag is the second value, the procedure goes to block S307. If the shutdown flag is the third value, the procedure goes to block S308.

In block S306, the determining module 240 determines that the electronic device 11 is shut down because of the DC power failure, and records a DC power failure log into the storage device 15 of the BMC 12.

In block S307, the determining module 240 determines that the electronic device 11 is shut down because of the AC power failure, and records an AC power failure log into the storage device 15 of the BMC 12.

In block S308, the determining module 240 determines that the electronic device 11 is shut down normally, the procedure ends.

In other embodiments, if the electronic device 11 is turned on a next time in block S305, the procedure may return to block S302 to update the shutdown flag with the first value.

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A method for detecting a power failure type of an electronic device, the method comprising:
   setting a shutdown flag as a first value when the electronic device is turned on, and storing the shutdown flag in a storage device of a baseboard management controller (BMC) of the electronic device;
   modifying the shutdown flag to a second value if a shutdown status of the electronic device is detected;
   modifying the shutdown flag to a third value when the electronic device keeps the shutdown status for a predetermined time;
   reading a value of the shutdown flag from the storage device of the BMC when the electronic device is turned on at a next time; and
   determining that the electronic device is shut down because of a direct current (DC) power failure upon the condition that the read value of the shutdown flag is the first value, and recording a DC power failure log into the storage device of the BMC.

2. The method according to claim 1, further comprising: determining that the electronic device is shut down because of an alternating current (AC) power failure upon the condition that the read value of the shutdown flag is the second value, and recording an AC power failure log into the storage device of the BMC.

3. The method according to claim 1, further comprising: determining that the electronic device is shut down normally upon the condition that the read value of the shutdown flag is the third value.

4. The method according to claim 1, wherein the storage device is a field replacement unit (FRU) storage area of the BMC of the electronic device.

5. The method according to claim 1, wherein the predetermined time is greater than two seconds.

6. An electronic device, comprising:
   a storage device;
   a baseboard management controller (BMC);
   at least one processor; and
   one or more modules that are stored in the storage device and are executed by the at least one processor, the one or more modules comprising instructions:
   to set a shutdown flag as a first value when the electronic device is turned on, and store the shutdown flag in a storage device of the BMC of the electronic device;
   to modify the shutdown flag to a second value if a shutdown status of the electronic device is detected;
   to modify the shutdown flag to a third value when the electronic device keeps the shutdown status for a predetermined time;
   to read a value of the shutdown flag from the storage device of the BMC when the electronic device is turned on at a next time; and
   to determine that the electronic device is shut down because of a direct current (DC) power failure upon the condition that the read value of the shutdown flag is the first value, and record a DC power failure log into the storage device of the BMC.

7. The electronic device according to claim 6, wherein the one or more modules further comprise instructions: determining that the electronic device is shut down because of an alternating current (AC) power failure upon the condition that the read value of the shutdown flag is the second value, and recording an AC power failure log into the storage device of the BMC.

8. The electronic device according to claim 6, wherein the one or more modules further comprise instructions: determining that the electronic device is shut down normally upon the condition that the read value of the shutdown flag is the third value.

9. The electronic device according to claim 6, wherein the storage device is a field replacement unit (FRU) storage area of the BMC of the electronic device.

10. The electronic device according to claim 6, wherein the predetermined time is greater than two seconds.

11. A non-transitory storage medium having stored thereon instructions that, when executed by a processor of an electronic device, causes the processor to perform a method for detecting a power failure type of the electronic device, the method comprising:
    setting a shutdown flag as a first value when the electronic device is turned on, and storing the shutdown flag in a storage device of a baseboard management controller (BMC) of the electronic device;
    modifying the shutdown flag to a second value if a shutdown status of the electronic device is detected;
    modifying the shutdown flag to a third value when the electronic device keeps the shutdown status for a predetermined time;
    reading a value of the shutdown flag from the storage device of the BMC when the electronic device is turned on at a next time; and
    determining that the electronic device is shut down because of a direct current (DC) power failure upon the condition that the read value of the shutdown flag is the first value, and recording a DC power failure log into the storage device of the BMC.

12. The non-transitory storage medium according to claim 11, wherein the method further comprises: determining that the electronic device is shut down because of an alternating current (AC) power failure upon the condition that the read value of the shutdown flag is the second value, and recording an AC power failure log into the storage device of the BMC.

13. The non-transitory storage medium according to claim 11, wherein the method further comprises: determining that the electronic device is shut down normally upon the condition that the read value of the shutdown flag is the third value.

14. The non-transitory storage medium according to claim 11, wherein the storage device is a field replacement unit (FRU) storage area of the BMC of the electronic device.

15. The non-transitory storage medium according to claim 11, wherein the predetermined time is greater than two seconds.

16. The non-transitory storage medium according to claim 11, wherein the non-transitory storage medium is selected from the group consisting of a hard disk drive, a compact disc, a digital video disc, and a tape drive.

* * * * *